May 3, 1955
H. H. PELZER ET AL
2,707,467
REEL UNIT FOR DOUCHE APPARATUS
Filed Feb. 3, 1954
2 Sheets-Sheet 1
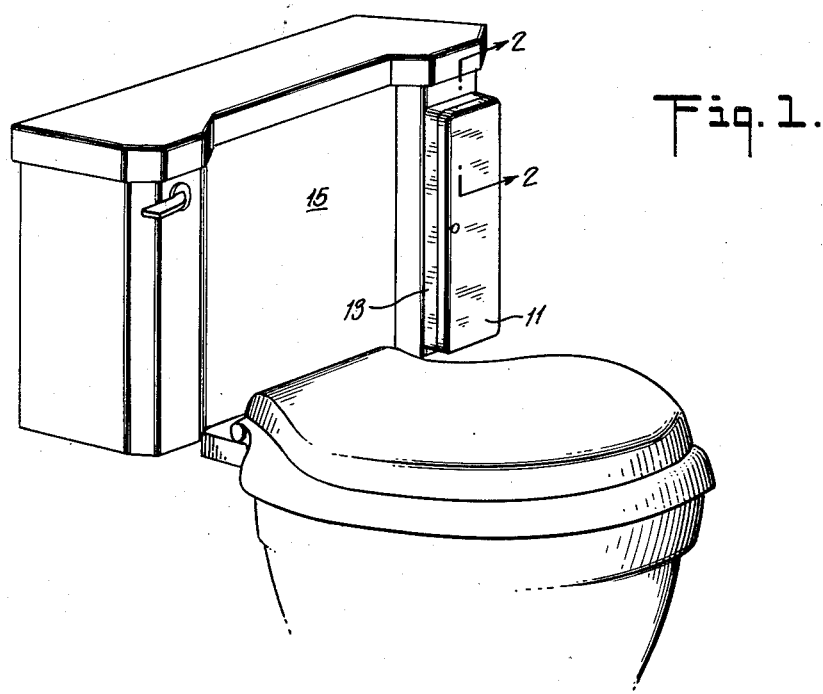
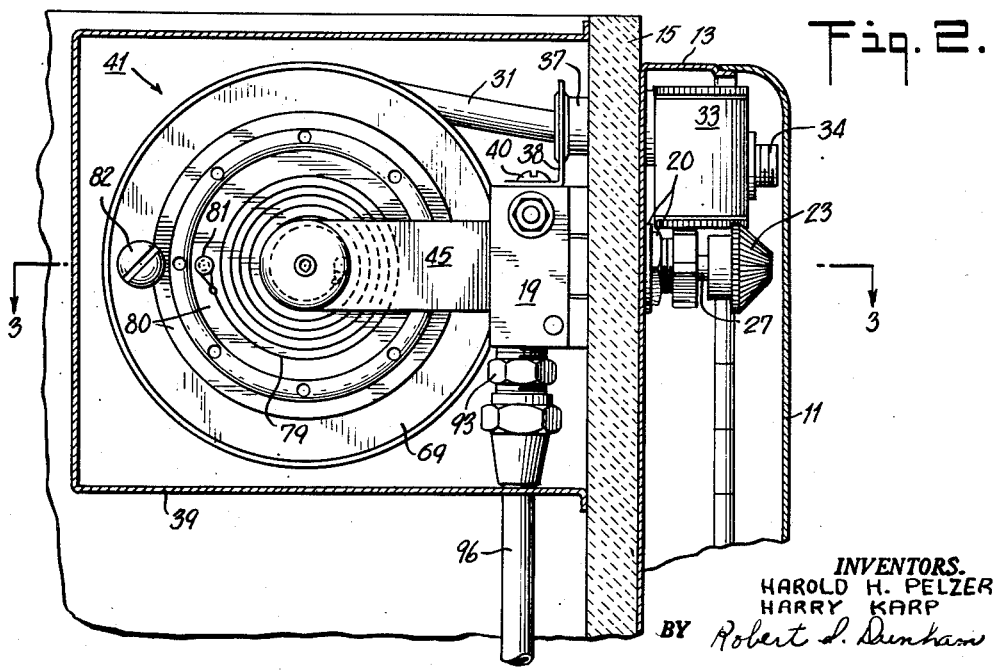
INVENTORS.
HAROLD H. PELZER
HARRY KARP
BY Robert L. Dunham
ATTORNEY

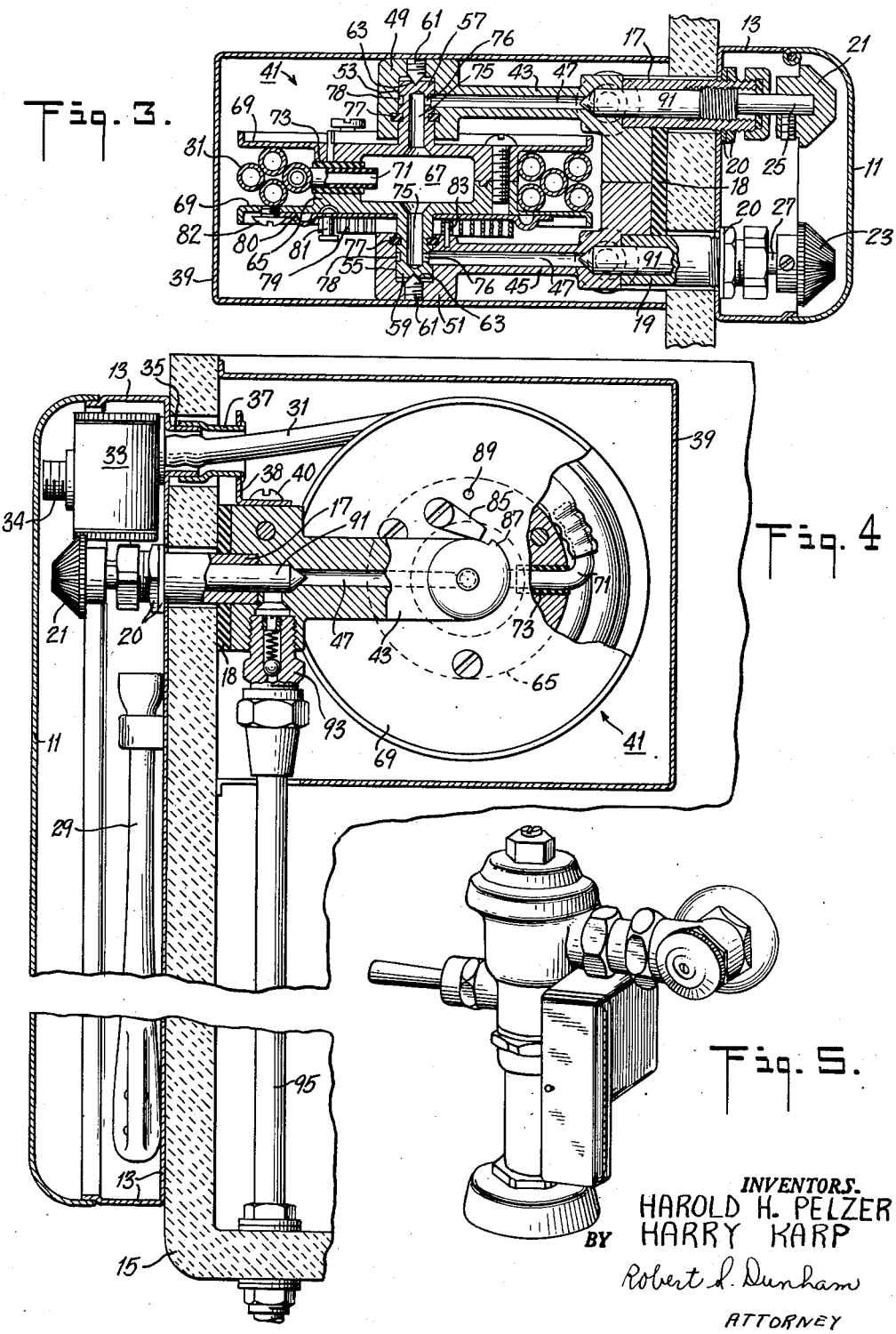

United States Patent Office 2,707,467
Patented May 3, 1955

2,707,467

REEL UNIT FOR DOUCHE APPARATUS

Harold H. Pelzer, Long Island City, and Harry Karp, Bronx, N. Y.; said Pelzer assignor to said Karp Application February 3, 1954, Serial No. 407,927

5 Claims. (Cl. 128—229)

This invention relates to bathroom fixtures, and more specifically to an improved personal hygienic device that is adapted for concealed mounting adjacent to a bathroom fixture having a water drainage system.

The invention may be briefly described as an improved and compact bathroom appliance for providing an extensible, uniform flow supply of temperature regulatable water for douche, enema or other personal hygiene purposes, and including a compact unitary hose supporting reel and mixing chamber.

One of the advantages of the structure herein described lies in the fact that its compact size permits installation in existing facilities as well as in new facilities without interference with the valve systems and other mechanisms conventionally used in such types of fixture.

Another advantage of the structure herein disclosed lies in its unobtrusive appearance and ready adaptability to most, if not all, existing facilities.

It is an object of this invention to provide a concealed and compact fixture for a water conveying flexible hose incorporating a unitary reel and water mixing chamber.

Another object of this invention is to provide a compact unit for supporting an extensible and retractable conveyor for a supply of water for personal hygiene purposes wherein the unit has a hollow hub and axles having passages therein that are connected to the hollow hub, and by means of which hot and cold water may be introduced into the mixing chamber in the hub.

It is also an object of this invention to provide a reel for a flexible hose having a unitary reel and mixing chamber incorporated therewith.

Another object of this invention is to provide an improved bathroom fixture including a reel having a hollow mixing chamber in the hub thereof and adapted for extensibly and retractably supporting a flexible hose thereon; the reel further including a spring for biasing the reel into a wound up position for the flexible hose and including a pawl arrangement for acting as a detent to maintain the hose in an extended condition when desired.

Other objects and advantages of the invention will be pointed out in the following disclosure and claims and illustrated in the accompanying drawings, which illustrate, by way of example, the presently preferred apparatus incorporating the principles of the invention.

In the drawings:

Fig. 1 is a perspective view of the apparatus of this invention as mounted on the side of the flush tank for a conventional domestic style toilet;

Fig. 2 is a fragmentary enlarged elevational view, partly in cross-section, of the apparatus taken along the line 2—2 of Fig. 1, looking in the direction of the arrows;

Fig. 3 is a cross-sectional view at the center line of the reel and taken along the line 3—3 of Fig. 2 looking in the direction of the arrows;

Fig. 4 is a side elevation, partly in cross-section, showing the other side of the reel from that illustrated in Fig. 2; and Fig. 5 is an oblique view illustrating one possible mounting for the apparatus of this invention, on a flush valve of the type most often used in public or semi-private toilet facilities.

Referring to Fig. 1, it may be seen that the apparatus as mounted on the flush tank of the usual domestic style toilet has a neat and unobtrusive appearance and maintains the inner components thereof concealed from view. There is provided a hinged door 11 that closes on to a relatively shallow container 13. The container 13 is preferably fastened on to the outside surface of a suitably perforated flush tank 15 by means of the fastening elements 20, which as illustrated are a nut and washer arrangement associated with the extending body portions of a pair of hot and cold water valves 17 and 19. In the illustrated construction the body portions of these valves are pressed into the reel supporting arms 43 and 45. The nut and washer assemblies 20, together with the gasket 18 serve to clamp the supporting structure and the container 13 securely to the wall of the flush tank 15. The valves 17 and 19 are provided with handles 21 and 23, respectively, disposed within the container 13 for manually controlling the amount of water flow through the valves. Each of these handles is fastened to their respective shafts 25 and 27 by means of a slip fit over the ends thereof and securely positioned thereon by means of the usual set screw as illustrated.

The container 13 is sized to provide storage space for spare attachments such as a douche nozzle 29 (Fig. 4). Disposed above the valve handles 21 and 23 is a control valve 33 adapted to be secured intermediate the end of a flexible hose 31 and any attachment adapted to be fastened on to the threaded outlet plug 34 thereof, for manually controlling the rate of flow of liquid from said attachment.

Centrally disposed adjacent the upper portion of the shallow container 13 is a hole defined by an extending flange member 35 (Fig. 4). Fitted over the flange 35 is a shaped sleeve member 37 which cooperates with the flange 35 to serve as a guide for the flexible hose 31, when the same is extended and/or retracted. The sleeve 37 is firmly positioned by an apertured angle member 38 secured to the reel supporting arms as by the screw 40.

Disposed within the water tank 15 and thereby concealed from view is a housing envelope 39 which forms a protective enclosure around a compact unitary reel and mixing chamber unit 41 vertically positioned therein. The reel and mixing chamber unit 41 is rotatably supported by a pair of supporting arms 43 and 45, that are secured to and extend horizontally from the body portion of the valves 17 and 19. In each of these arms 43 and 45 there is provided a passage 47 extending longitudinally therethrough for transmitting a manually regulated supply of hot and cold water, as determined by the opening of the valves 17 and 19. At the ends of the arms 43 and 45 there are provided cylindrically shaped sockets 49 and 51 (Fig. 3). Each of these sockets has an aligned horizontally disposed cylindrical bore 53 and 55 sized to rotatably receive a pair of extending supporting axles 57 and 59 for the reel and mixing chamber unit 41. Centrally located in the ends of each of the sockets 49 and 51, there is a conical tipped bearing screw 61 which is adapted to engage a correspondingly shaped bearing surface 63 axially disposed in the ends of each of the axles 57 and 59.

The combination reel and mixing chamber unit 41 is made up of a central hub section 65 defining and forming a hollow mixing chamber 67 therewithin. Extending radially outwardly from the edges of the hub section 65 and securely mounted thereon are a pair of annular plates 69 which thereby constitute the sides of the reel and define together with the hub, a storage space for winding the flexible hose 31 thereon. In order to attach the inner end of the flexible hose 31 to the reel, and to also maintain a fluid coupling passageway from the centrally disposed mixing chamber 67 into the flexible hose 31, there is provided an angled tube 71, one edge of which is securely fastened into the hub 65 in a leak-proof manner as by means of a resilient material sleeve 73 and the other end of which receives the inner end of the flexible hose 31.

The fluid connection intermediate the passages 47 in the supporting arms 43 and 45 and the mixing chamber or space 67 includes a pair of axially located passages 75 in the axles 57 and 59. These passages 75 terminate at their outer ends in short radially disposed passages 76 communicating with a circular groove 78 externally embedded on the outer surfaces of said axles 57 and 59. The grooves 78 are positioned to register with the ends of the passages 47 and thereby to provide a fluid connection irrespective of the positional relationship between the radial passages 76 contained in the rotatable member and the passage 47 contained in the fixed member. Water-tight rotatable seals 77 are provided intermediate the axles 57 and 59 and the bearing sockets 49 and 51 in order to provide a water-tight or leak-proof connection. In summary therefore, the path of water flow irrespective of the rotative position of the reel is through the open hot and cold water valves 17 and 19 into the passages 47, thence through the grooves 78, and the radial passage 76 communicating therewith, into the passages 75 in the axles 57 and 59, and into the mixing chamber 67. The mixing chamber 67 permits the entering hot and cold water, which enters from the sides of the chamber, to mix thoroughly and to reach a uniform temperature. The mixed and uniform temperature water then leaves the chamber 67 at the periphery thereof and centrally of the incoming water through the angle tube 71 and the flexible hose 31 attached thereto.

In order to provide for automatic retraction of the extended hose when in use and to maintain a tension on the extended hose to prevent kinking thereof, there is provided a coil spring 79 secured to one side of the reel unit. As illustrated, the coil spring 79 has one end thereof secured to an adjustment plate 80 by a rivet 81. The other end of the coil spring 79 is attached to the arm 45 in a conventional manner as by means of a pin 83. The plate 80 is held securely against the side of the reel unit 41 by the head of a screw 82; there being a recess in the side of the reel to receive the riveted end of rivet 81. The spring 79 is preferably installed so as to exert some tension in the retracted position so that the reel is normally biased for a wound up condition for the flexible hose 31 as illustrated. The amount of tension exerted may be readily and conveniently adjusted in increments of a single revolution of the plate 80 by use of the above described and illustrated construction.

Pivotally secured to the other side of the reel unit 41 is a free pawl 85 (Fig. 4). The pawl 85 cooperates to act as a detent in connection with a straight or slightly sloped cam surface 87, that is preferably integrally formed on the outside of the socket 49 on the end of the arm 43. There is also provided a stop pin 89 mounted on the side of the reel to prevent the pawl 85 from pivoting outwardly, due to centrifugal force, beyond a given position.

After the hose 31 has been extended for use, the reel will be maintained in the extended position by the engagement of the cam surface by the pawl 85. When it is desired to retract the hose to its wound up condition after use, all that is necessary to effect the same is that the hose be pulled somewhat further out and then rapidly released so that the centrifugal force acting on the pawl 85 due to rotation of the reel under action of the spring 79 will cause it to pivot radially outward against its stop pin 89 and therefore clear the straight surface of the detent cam 89 and so allow the reel to wind up the flexible hose 31 as desired.

The hot and cold water valves 17 and 19 are illustrated as having axially displaceable core members 91 having a conical seating surface adapted to engage a similarly shaped seat in the supporting arms 43 and 45. As illustrated, the positions of the core members 91 are controlled by manual rotation of the easily accessible handles 21 and 23 which, of course, rotate the shafts 25 and 27 and cause longitudinal displacement of the cores 91 on to or away from the seating surfaces. Due to the nature of the device and the purposes for which it may be used, there should also be located in each of the hot and cold water supply pipes a suitable check valve or vacuum breaking valve 93. This valve 93 is commercially available in a fitting such as that illustrated. As illustrated in Fig. 4, the hot water supply enters through a pipe line 95. If desired, the cold water supply 96 (Fig. 2) may also be obtained in a similar manner, however it is often more convenient and desirable to obtain the cold water supply by tapping into the regular cold water supply line conventionally available in flush tanks of the type illustrated.

Fig. 5 illustrates a possible location for the unit of this invention in connection with a flush valve type of water supply for a toilet such as is often found in public or semi-private or institutional installations. Instead of being secured to the flush valve as illustrated, it could readily be disposed in a suitable wall recess located adjacent thereto. The described unit is also not limited to use adjacent a bathroom fixture of the type described and will find utility and could also be conveniently located near any fixture having a suitable drainage system, such as a basin or tub (not shown).

It will be noted that the complete unit embodying this invention may be readily attached to a conventional water tank for a domestic type of toilet, by means of drilling only four suitably located holes through the side and bottom walls of the tank. These four holes serve to accommodate the hot and cold water valves 17 and 19, the flange and sleeve elements 35 and 37 for providing a passage to permit the egress of the flexible hose 31, and the hot water line 95 (the cold water line being preferably tapped within the flush tank). For new installations, the unit could be installed as described above or in specially designed and recessed flush tanks.

It is also to be noted that the unit as mounted has a very unobtrusive and attractive appearance. All of the external elements for the hygienic fixture of this invention may be neatly and compactly enclosed within the container 13 having its door 11 hinged to the front thereof. It should also be understood that there are provided suitable washers and packings as needed to prevent any leakage, e. g. where pipes or other elements pass through the walls of the tank 15.

In accordance with the provisions of the patent statutes, we have herein described the principle of operation of this invention, together with the elements which we now consider to constitute a workable embodiment thereof, but we desire to have it understood that the structure disclosed is only illustrative and the invention can be carried out by other means. Also, while it is designed to use the various features and elements in the combinations and relations described, some of these may be altered and modified without interfering with the more general results outlined.

Having thus described our invention, we claim:

1. A bathroom fixture having an unobtrusive appearance comprising means for supplying hot and cold water, valve means for regulating the supply of each, a unitary mixing chamber and reel combination, separate means connecting the output side of said hot and cold valve means to said mixing chamber, and a flexible hose adapted to be wound on said reel and connected to said mixing chamber for drawing the mixture from said chamber when the hose is extended.

2. In a bathroom fixture having an unobtrusive appearance means attachable to external sources of hot and cold water for supplying the same, valve means associated with said last-mentioned means for regulating the supply of said hot and cold water, a reel having a hollow hub defining a water mixing chamber therein and axles thereon, passages in said axles and connected to the mixing chamber in said hollow hub, means connecting the output side of said valve means to said axle passages, an outlet passage connected to the mixing chamber in said hollow hub, a flexible hose having one end connected to said outlet passage for drawing mixed water from said chamber in said hollow hub, a spring attached to said reel for winding said hose on the reel, and a releasable pawl attached to said reel for holding the hose in an unwound condition.

3. In a douche type bathroom fixture adapted for unobtrusive mounting near another bathroom fixture having a water drainage system, a flexible hose having attachment means at one end thereof for a douche or like spray device, a reel for carrying said hose having a mixing chamber contained within the hub thereof, separate means attachable to a hot and cold water supply including a valve member in each to regulate the supply of hot and cold water, means connecting said hot and cold water supply means to said mixing chamber, and means connecting the other end of said flexible hose to said mixing chamber so that a compact and trouble free unit is had.

4. In a douche type bathroom fixture adapted for unobtrusive mounting near another bathroom fixture having a water drainage system, a flexible hose having attachment means at one end thereof for a douche or like spray device, means attachable to a hot and cold water supply including valves associated therewith for controlling the supply of hot and cold water, a reel for carrying said hose having a mixing chamber contained therein, said reel having axles, passages in said axles connected to the mixing chamber, means for connecting the output side of said valves included in said means attachable to said hot and cold water supply to said passages, and means for permanently connecting the other end of said hose to said mixing chamber for drawing mixed hot and cold water therefrom.

5. The combination according to claim 4, further including spring means for urging said reel to wind up the hose thereon, and centrifugally operable pawl means for holding the hose in an unreeled state when extended predetermined amounts.

References Cited in the file of this patent
UNITED STATES PATENTS

| | | |
|---|---|---|
| 1,441,572 | France | Jan. 9, 1923 |
| 1,901,660 | Lund | Mar. 14, 1933 |